United States Patent [19]

Takahashi

[11] Patent Number: 4,891,836

[45] Date of Patent: Jan. 2, 1990

[54] COMMUNICATION TERMINAL HAVING A CHARGE DISPLAYING FUNCTION

[75] Inventor: Shuichi Takahashi, Sagamihara, Japan

[73] Assignee: Ricoh Company, Ltd., Tokyo, Japan

[21] Appl. No.: 179,648

[22] Filed: Apr. 8, 1988

[30] Foreign Application Priority Data

Apr. 10, 1987 [JP] Japan .................................. 62-87019

[51] Int. Cl.4 .................. H04M 17/00; H04M 15/02; H04M 11/00
[52] U.S. Cl. ..................................... 379/100; 379/132
[58] Field of Search .................. 379/93, 98, 100, 130, 379/131, 132, 155; 358/257; 178/2 F

[56] References Cited

U.S. PATENT DOCUMENTS

| | | | |
|---|---|---|---|
| 4,106,060 | 8/1978 | Chapman, Jr. ................... | 379/93 X |
| 4,415,981 | 11/1983 | Cutter et al. ........................ | 358/257 |
| 4,585,904 | 4/1986 | Mincone et al. . | |

FOREIGN PATENT DOCUMENTS

| | | | |
|---|---|---|---|
| 0134693 | 3/1985 | European Pat. Off. ............ | 379/132 |
| 57-15563 | 1/1982 | Japan . | |
| 57-99858 | 6/1982 | Japan . | |
| 61-208946 | 9/1986 | Japan ..................................... | 379/93 |
| 63-46870 | 2/1988 | Japan . | |
| 2185362 | 7/1987 | United Kingdom ................ | 379/100 |

Primary Examiner—Keith E. George
Attorney, Agent, or Firm—Oblon, Spivak, McClelland, Maier & Neustadt

[57] ABSTRACT

A facsimile machine having a function of calculating a service charge for transmitting an image data to a remote receiver facsimile and displaying the thus calculated charge in a display. The image data is transmitted to the receiver facsimile only when at least part of said charge is paid by the user. The facsimile machine is provided with a charge collecting unit for paying the charge. Such a facsimile machine defines an attendance-free communication terminal for document transmission service, which may be used in a manner similar to a pay phone.

21 Claims, 25 Drawing Sheets

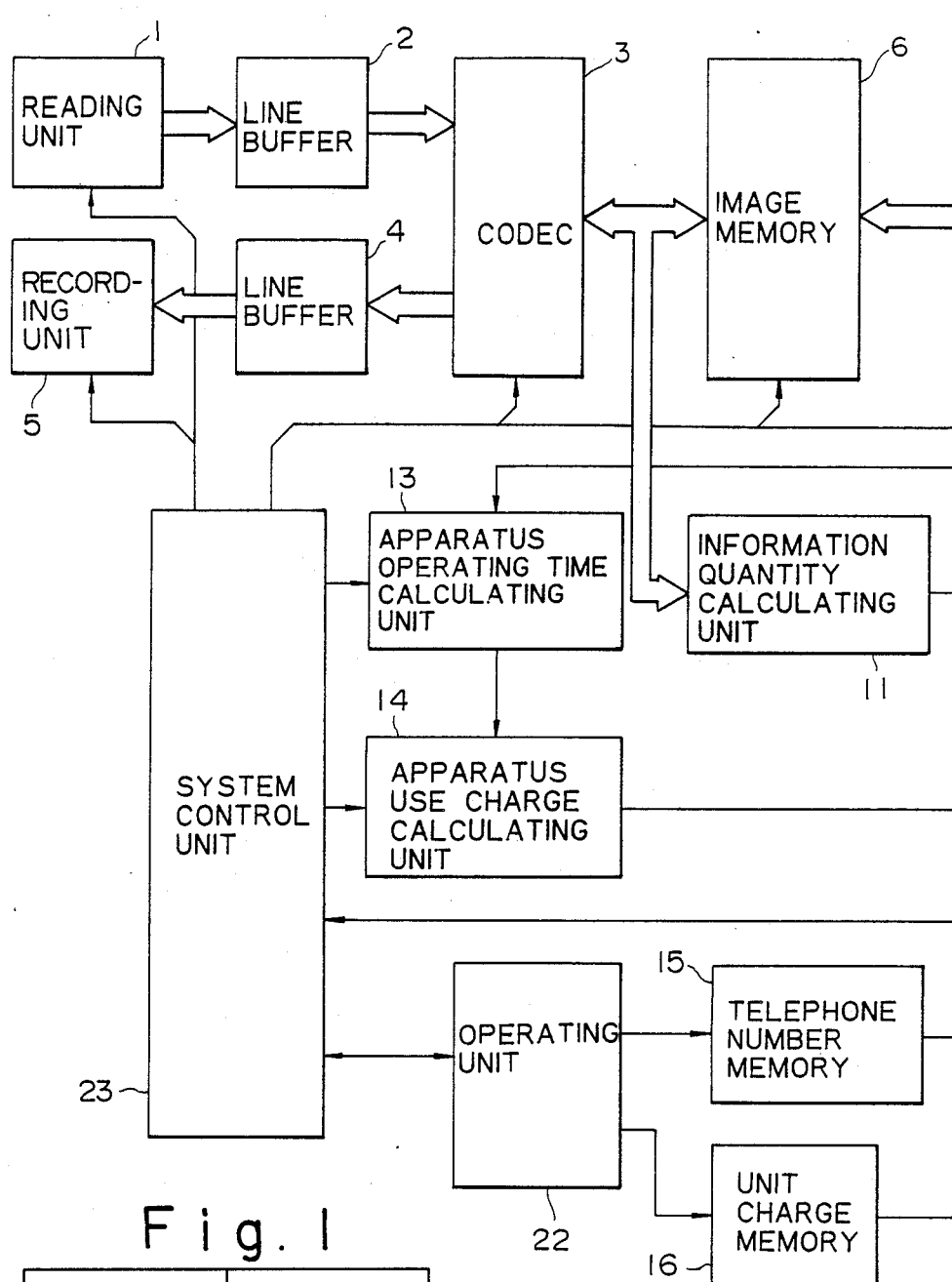

Fig. 2

| DESTINATION | COMMUNICATION CHARGE | $00.00 |
|---|---|---|
| 03-555-1234 | APPARATUS USE CHARGE | $ 0.00 |
| | TOTAL USE CHARGE | $□□.□□ |

PLEASE PAY $□□.□□.

Fig. 3

CHARGE FOR COPYING

NO. OF SHEETS  OO  $OO.OO

PLEASE PAY $OO.OO.

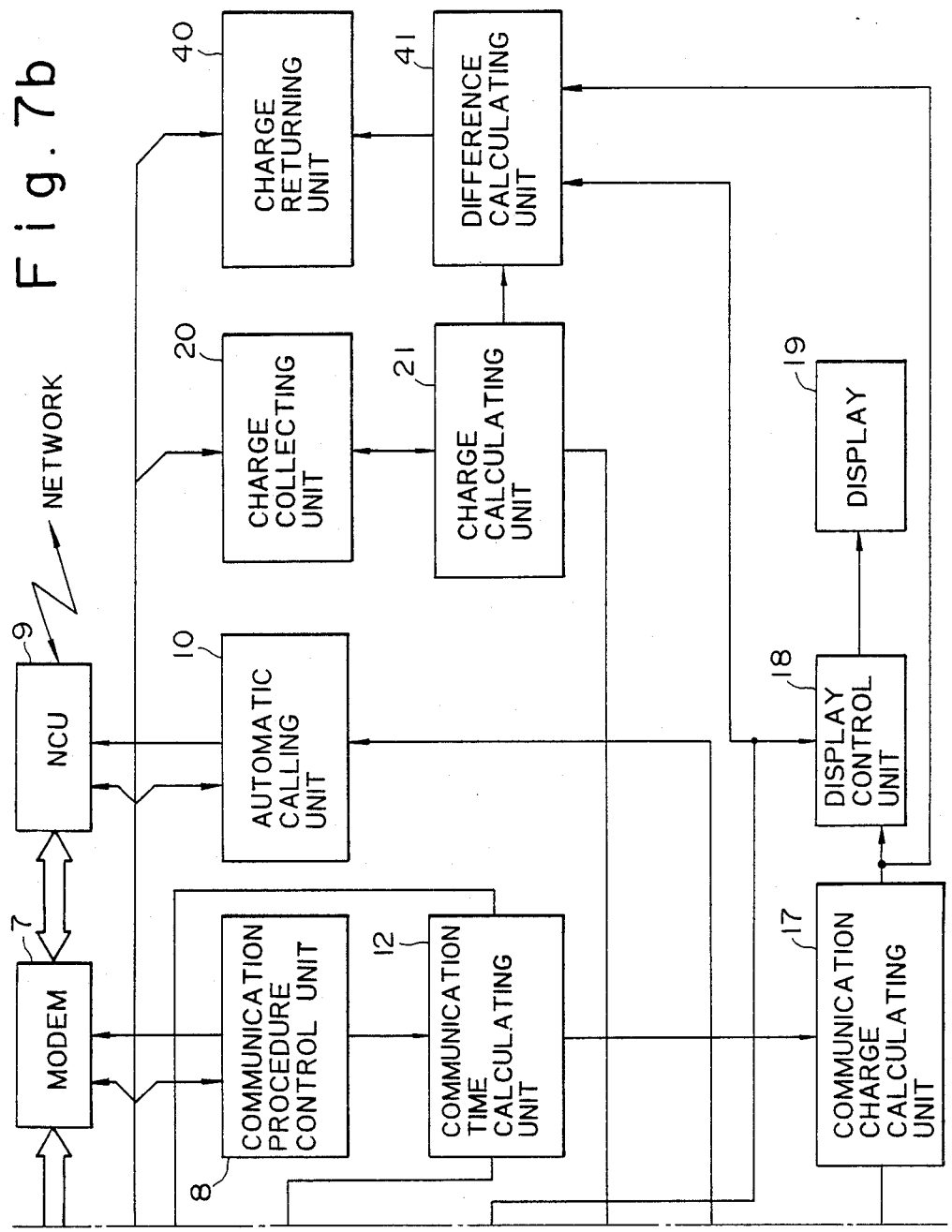

Fig. 9

| COMMUNICATION CHARGE | $00.00 | —a |
| APPARATUS USE CHARGE | $ 0.00 | —b |
| TOTAL USE CHARGE | $□□.□□ | —c |

DESTINATION
03-555-1234   —e

PLEASE PAY $□□.□□.   —d

Fig. 12

| DESTINATION | CHARGE ALREADY PAID | $OO.OO |
| --- | --- | --- |
| 03-555-1234 | FINAL CHARGE | $O.OO |
| | CHARGE DIFFERENCE | $OO.OO |

PLEASE PAY $OO.OO WITHIN OO SECONDS.

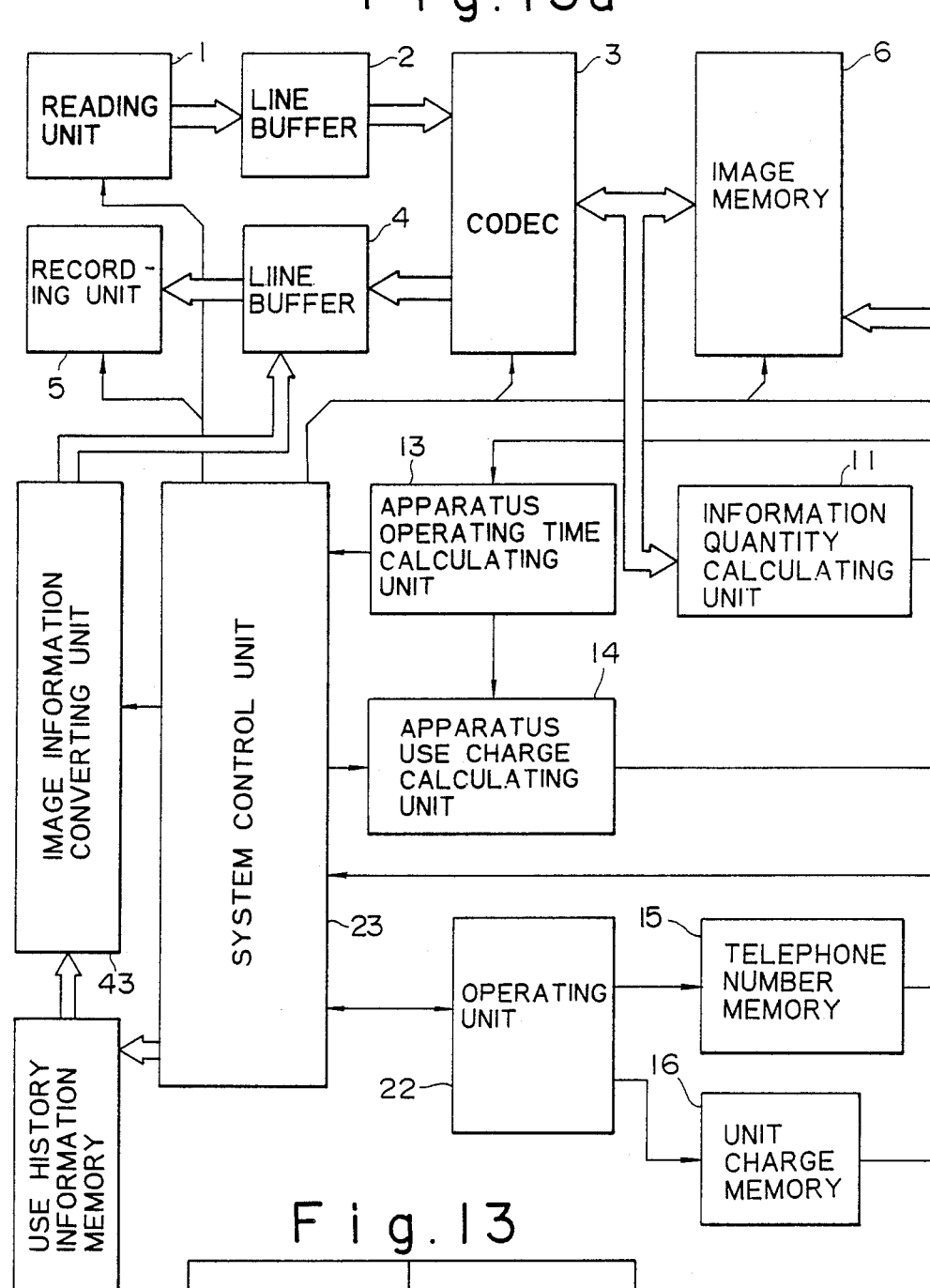

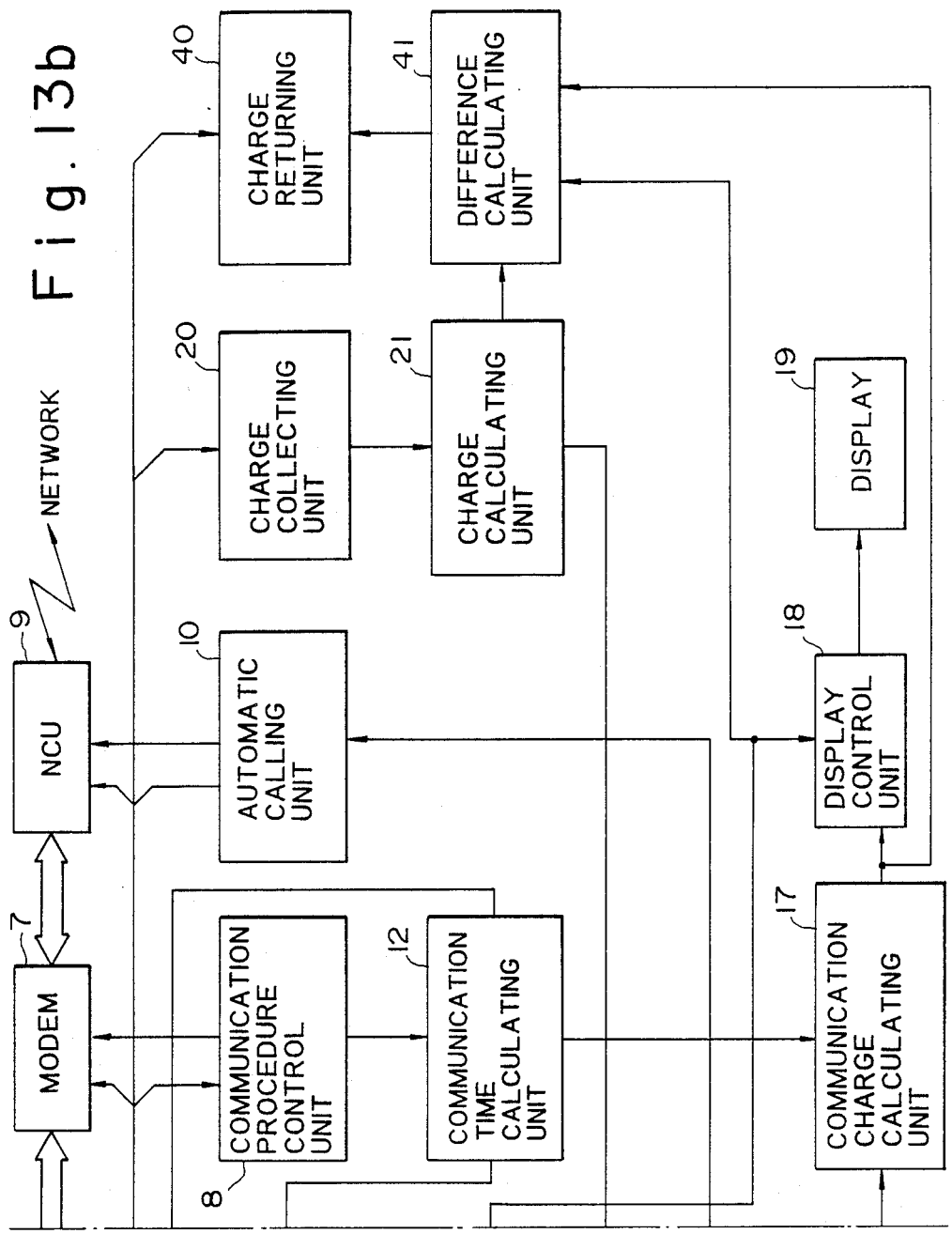

Fig. 16

[STATEMENT OF DOCUMENT TRANSMISSION SERVICE]

| | | USE CHARGE | $00.00 | — f |
|---|---|---|---|---|

DESTINATION — g
03-555-0000

TIME — h
11:00

COMMUNICATION TIME — i
5MIN.10SEC

BASIC CHARGE — j
$00.00

COMMUNICATION CHARGE — k
$00.00

SERVICE CHARGE — ℓ
$00.00

FEBRUARY 1, 1987. — m

ADDRESS  1-2-3, TOKYO.
xxxx CO., LTD.
FAX NO. 03-444-0000
— n

Fig. 17

[HISTORY OF USING THE SERVICE]

FEBRUARY 1, 1987. -- m

| NO. | DESTINATION | TIME | COMMUNI-CATION TIME | USE CHARGE | BASIC CHARGE | COMMUNI-CATION CHARGE | SERVICE CHARGE |
|---|---|---|---|---|---|---|---|
| 1. | 03 555-0000 | 11:00 | 5MIN.10 SEC. | $1.15 | $0.10 | $10.00 | $0.50 |
| 2. | 045 555-0000 | 11:19 | 2MIN.21SEC. | $0.26 | $0.10 | $6.00 | $0.50 |
| 3. | COPY | 12:01 | 1MIN.11 SEC. | $0.10 | $0.50 | | $0.50 |

$112.00  $20.50  $80.00  $11.50

COMMUNICATION TERMINAL HAVING A CHARGE DISPLAYING FUNCTION

BACKGROUND OF THE INVENTION

1. Field of the Invention

This invention generally relates to a communication terminal for use in data communication, such as a facsimile machine, and in particular to a data communication terminal having a function of displaying the charge for using the terminal.

2. Description of the Prior Art

A facsimile machine is widely used as a data communication terminal. Recently, a facsimile machine is installed in a stationary store or the like to thereby provide a document transmission service for customers. In such a case, the service charge for transmitting a set of originals must be calculated on the basis of the communication time and the distance to the destination because the telephone charge varies depending on time and distance. As a result, the operator at the stationary store must measure the communication time expended for transmission of a set of originals and then consult with a charge schedule to calculate the telephone communication charge. And, then, a predetermined charge for using the facsimile machine is added to the telephone charge to arrive at the total service charge. In this manner, the operator at the stationary store is required not only to operate the facsimile machine, but also to go through calculations to determine the service charge each time, which is quite cumbersome. In addition, it is also disadvantageous for the customer because the service charge is unknown until the transmission has been completed.

Other than facsimile machines, teletex machines are also being used as communication terminals for providing information transmission service. In this case also, there are similar disadvantages.

SUMMARY OF THE INVENTION

In accordance with one aspect of the present invention, there is provided a data communication terminal in which a communication charge per unit time depending on a telephone number of a destination to which data is to be transmitted is first determined. Then, data to be transmitted is once stored in a memory and a required communication time period is calculated based on the amount of data thus stored in the memory, a communication speed and the time required for a communication control procedure. Then, a total charge is calculated from the communication charge per unit time and the calculated communication time period, and the thus calculated total charge is displayed prior to the initiation of transmission of the data. It is preferably so structured that the transmission of data takes place only after payment of the thus calculated total charge.

In accordance with another aspect of the present invention, there is provided a data communication terminal in which data to be transmitted is once stored in a memory. And, when an operator makes payment, for example, by depositing coin, the amount of data which may be transmitted to a destination by the deposited coin is calculated, and a range of the data which can be transmitted by the deposited money is indicated. If the indicated range of the data is sufficient, the operator gives a command to the communication terminal so that only the indicated range of the data is transmitted to the destination.

In accordance with a further aspect of the present invention, there is provided a data communication terminal which calculates a service charge for transmitting data to a desired destination and displays the thus calculated service charge. Besides, the terminal also includes recording means for recording a statement of use as an output, describing various information such as the charge payed and date used.

In accordance with a still further aspect of the present invention, there is provided a data communication terminal which calculates a service charge for transmitting data to a desired destination depending on the amount of the data to be transmitted and the distance to the destination and displays the thus calculated service charge. Preferably, the calculation is carried out assuming the lowest transmission speed. Upon payment of the displayed service charge, the transmission of data is initiated. During transmission of data, the actual data transmission speed is determined, so that the service charge is recalculated based on this actual transmission speed, and a difference between the initial and recalculated service charges is returned, if overpaid.

It is therefore a primary object of the present invention to obviate the disadvantages of the prior art as described above and to provide an improved data communication terminal capable of displaying a charge for transmitting data prior to actual transmission.

Another object of the present invention is to provide an improved data communication terminal, such as a facsimile machine or teletex machine, which displays a service charge for transmitting data to a desired destination prior to transmission of data.

A still further object of the present invention is to provide an improved data communication terminal capable of outputting a service charge statement after each transmission of data to a desired destination.

A still further object of the present invention is to provide an improved data communication terminal capable of returning an excessive amount of payment, if any, upon completion of transmission of data to a desired destination, which has been initiated by payment of an initially calculated service charge.

Other objects, advantages and novel features of the present invention will become apparent from the following detailed description of the invention when considered in conjunction with the accompanying drawings.

BRIEF DESCRIPTION OF THE DRAWINGS

FIGS. 1a and 1b are block diagrams (which join as shown in FIG. 1) showing the overall structure of a facsimile machine constructed in accordance with one embodiment of the present invention;

FIG. 2 is an illustration showing an example of displaying a data transmission service charge in the facsimile machine of FIGS. 1a and 1b;

FIG. 3 is an illustration showing an example of displaying a copying service charge in the facsimile machine of FIGS. 1a and 1b;

FIG. 9 is an illustration showing an example of displaying a transmission service charge in the structure shown in FIGS. 7a and 7b;

FIG. 12 is an illustration showing an example of displaying the amount of insufficient charge as a difference between the initial payment and the final charge in the embodiment shown in FIGS. 11a and 11b;

FIGS. 13a and 13b are block diagrams (which join as shown in FIG. 13) showing the overall structure of a facsimile machine constructed in accordance with a still further embodiment of the present invention;

FIG. 16 is an illustration showing an output example of a recorded statement of document transmission service charges; and FIG. 17 is an illustration showing an output example of a recorded history of using the document transmission services.

DESCRIPTION OF THE PREFERRED EMBODIMENTS

Figure 1B:
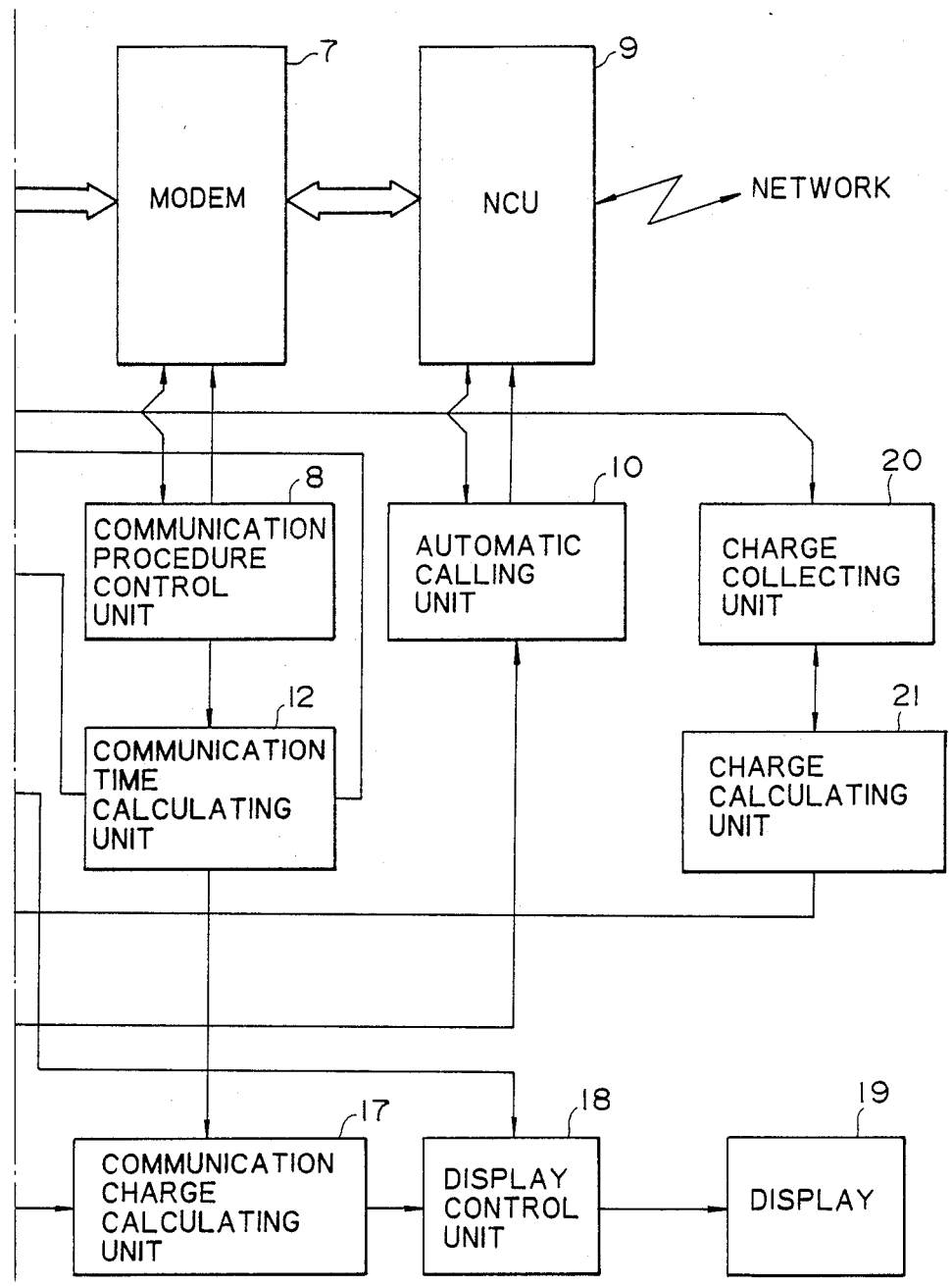

Referring now to FIGS. 1a and 1b, there is shown in block form a facsimile machine constructed in accordance with one embodiment of the present invention. As shown, the facsimile machine includes a reading unit 1 which optically reads an original (not shown) at a predetermined line density to thereby produce image information or data to be transmitted. One line of image data thus produced is then supplied into a line buffer 2 for temporary storage therein. Also provided is a CODEC (Coder/Decoder) 3 which converts image data into codes or decodes coded data into image information on the basis of G III rules of the CCITT Recommendations. Another line buffer 4 is also provided to store one line of image information received from a transmitting facsimile machine and a recording unit 5 receives the image information from the line buffer 4 to record the image information on a recording medium, such as a sheet of paper.

An image memory 6 receives and temporarily stores therein coded image information supplied from the CODEC 3. A MODEM 7 carries out transmission or reception of communication procedural signals under the control of a communication procedure control unit 8 and is also in charge of modulating image information to be transmitted and demodulating received image information. It is to be noted that in the present embodiment the data transmission speed of the MODEM 7 is fixed at a constant speed, e.g., at 4,800 bps. An NCU (Net Control Unit) 9 is in charge of connecting the facsimile machine to or disconnecting it from a transmission line. That is, the NCU 9 carries out a calling operation, such as establishing a connection to the transmission line and transmission of a selection signal, i.e., dialing number, and also a call receiving function by detecting the reception of a call. An automatic calling unit 10 is provided as connected to the NCU 9 for outputting a predetermined selection signal.

Also provided in the structure shown in FIGS. 1a and 1b is an information calculating unit 11 which detects and calculates the amount of data stored in the image memory 6, which includes all of the coded image information to be transmitted. A communication time calculating unit 12 is also provided for calculating a communication time period required for transmitting the image data stored in the image memory 6 to a destination prior to the initiation of transmission operation. Given that the amount of data to be transmitted is designated by D, a time period required for a communication control procedure is designated by $T_1$ and the data transmission speed is 4,800 bps, communication time period $T_0$ may be expressed by the following equation.

$$T_0 = (D/4,800) + T_1 \tag{1}$$

Although time $T_1$ in the above equation (1) slightly differs between the case of one page of original, and the case of two or more pages of original, the calculation is carried out on the basis of an average number of pages for the amount of data to be transmitted.

An apparatus operating time calculating unit 13 is to calculate the length of an apparatus operating time period from the initiation of operation of the present facsimile machine to the end of communication. An apparatus use (service) charge calculating unit 14 calculates a total service charge by multiplying the thus calculated apparatus operating time period by a charge per unit time. A telephone number memory 15 stores the telephone number of a destination to which data is to be transmitted, and a unit charge memory 16 stores information regarding various predetermined communication charges per unit time, which are typically determined by telephone companies. Depending on the telephone number of a destination to which data is to be transmitted, a corresponding communication charge per unit time is output from the unit charge memory 16. The thus output communication charge per unit time is supplied to a communication charge calculating unit 17 which also receives the calculated communication time period $T_0$ to thereby determine a communication charge. Then, at a display control unit 18, the communication charge thus obtained is added to the apparatus use charge to produce a total service charge which in turn is displayed at a display 19, which may be comprised of a CRT or a liquid crystal display.

There is also provided a charge collecting unit 20 to which the user may deposit coin or bills to make payment for the requested charge. A charge calculating unit 21 is also provided for counting the amount of money paid at the charge collecting unit 20. An operating unit 22 is an interface unit between the user and the present facsimile machine and the user can provide various commands, such as start to read originals, input the telephone number of a destination and start a transmission process, through the operating unit 22. A system control unit 23 is also provided for controlling each of the above-described units of the present facsimile machine and it determines the reception of a calculated service charge and executes the transmission of image information if paid.

With the above-described structure, the present facsimile machine may be installed as a pay facsimile machine like a pay phone in any desired place and unattended, if desired. Thus, the user may operate the present facsimile machine by himself if he has some originals to be transmitted to a remote facsimile machine. In this instance, in accordance with the present invention, prior to transmission of data, the service charge is calculated and displayed, so that when the user pays the service charge thus displayed, the present facsimile machines recognizes it and executes the transmission of data.

Described in detail the operation of the present facsimile machine having the above-described structure, the operator first places originals in position at the reading unit 1 and then inputs the facsimile telephone number of a remote facsimile machine (destination station). Then, the user depresses a start button. As a result, under the control of the system control unit 23, the reading unit 1 is activated and the image information thus read is coded by the CODEC 3 and sequentially stored into the image memory 6. The information counting unit 11 counts the amount of data being stored into the image memory 6 sequentially and detects the total amount of data to be transmitted to the destination station. Based on the amount of data thus detected, data transmission speed and the time required for a communication control procedure, the communication time calculating unit 12 calculates a communication time period according to equation (1). On the other hand, in response to the telephone number of the destination station thus input, the unit charge memory 16 outputs a corresponding communication charge per unit time, e.g., per one second. By taking a product of the communication charge per unit time from the memory 16 and the communication time period from the communication time calculating unit 12, the communication charge calculating unit 17 determines a required communication charge.

On the other hand, the apparatus operating time counting unit 13 counts a time period from the time when the user set the originals at the reading unit 1 for the first time to the time when storage of the image information of the originals into the image memory 6 has been completed and also determines a sum of that time and the communication time period calculated by the communication time calculating unit 12 as an apparatus using time period. Then, responsive to this apparatus using time period, the apparatus use time calculating unit 14 calculates an apparatus use charge. Then, the display control unit 18 adds the apparatus use charge and the communication charge to determine a total service charge which is displayed at the display 19, together with other information, as shown in FIG. 2.

Under the circumstances, the user pays the charge displayed at the display 19 by feeding coin or bills at the charge collecting unit 20. Then, the charge counting unit 21 counts the amount of money paid at the charge collecting unit 20. The system control unit 23 checks the amount paid and controls the operation of the charge depositing unit 20 to return a balance, if necessary. Then, the automatic calling unit 10 reads out the facsimile telephone number of the destination station from the telephone number memory 15 and initiates a predetermined calling process by controlling the operation of the NCU 9. Upon receipt of a response from the destination station, the communication procedure control unit 8 executes a predetermined communication control procedure, which is followed by the step of transmission of the image information stored in the image memory 6 via the MODEM 7. Upon completion of transmission, each of the components of the present facsimile machine returns to its initial condition.

It is so structured that if no response has been obtained or a busy signal has been obtained from the destination station over a predetermined time period after execution of the calling operation, the charge paid in the charge collecting unit 20 is automatically returned to the user.

As described above, in accordance with the above-described aspect of the present invention, the transmission speed of image information is set at a constant value and the image information of an original to be transmitted is once stored in the image memory 16 temporarily. Under this condition, the amount of the data to be transmitted is detected and the thus detected amount of data to be transmitted is multiplied by the transmission speed to determine the communication time period required for transmitting the data. And, this communication time period is added to the time period required for executing a communication control procedure to determine a total communication time period. On the other hand, information regarding communication charges per unit time depending on the location of a destination station from the source station is stored in a memory in advance. In response to an input facsimile telephone number, the location of the destination station is determined and an applicable communication charge per unit time is selected. Then, the thus selected communication charge per unit time is multipled by the total communication time period to determine a communication charge.

On the other hand, the operating time period of the present facsimile machine by the user is also counted and then the apparatus using charge is calculated. And this apparatus using charge is added to the communication charge to determine a total service charge which is displayed in the display 29 prior to the transmission of data.

As described above, since calculation of charge is carried out automatically by the present facsimile machine, the user is not required to have any special skills or experiences. And, the required charge is displayed prior to transmission of data, the user can check the service charge in advance and can transmit the data without worry.

In the above-described embodiment, the transmission speed is fixed. However, the transmission speed may be selectively determined depending on various factors, such as the conditions of a transmission line or length of a transmission line, if desired. The manner of determining the apparatus using charge may be carried out in various ways. For example, it can be determined depending on the number of originals. In addition, since the present facsimile machine may serve as an ordinary copying machine, so that if the user operates the present facsimile machine as a copying machine, the image information is once stored in the image memory 6 and then the time required for recording this image information by the recording unit 5 is calculated by the apparatus operating time calculating unit 13 and the charge is calculated on the basis of this time. Then, the charge may be displayed at the display 19 as a copy charge together with a message requesting the user to pay the charge.

It is to be noted that the above description has been made for a facsimile machine, but the present invention should not be limited only to facsimile machines. For example, the present invention may also be applied to teletex machines when used in a similar manner.

Figure 4A:
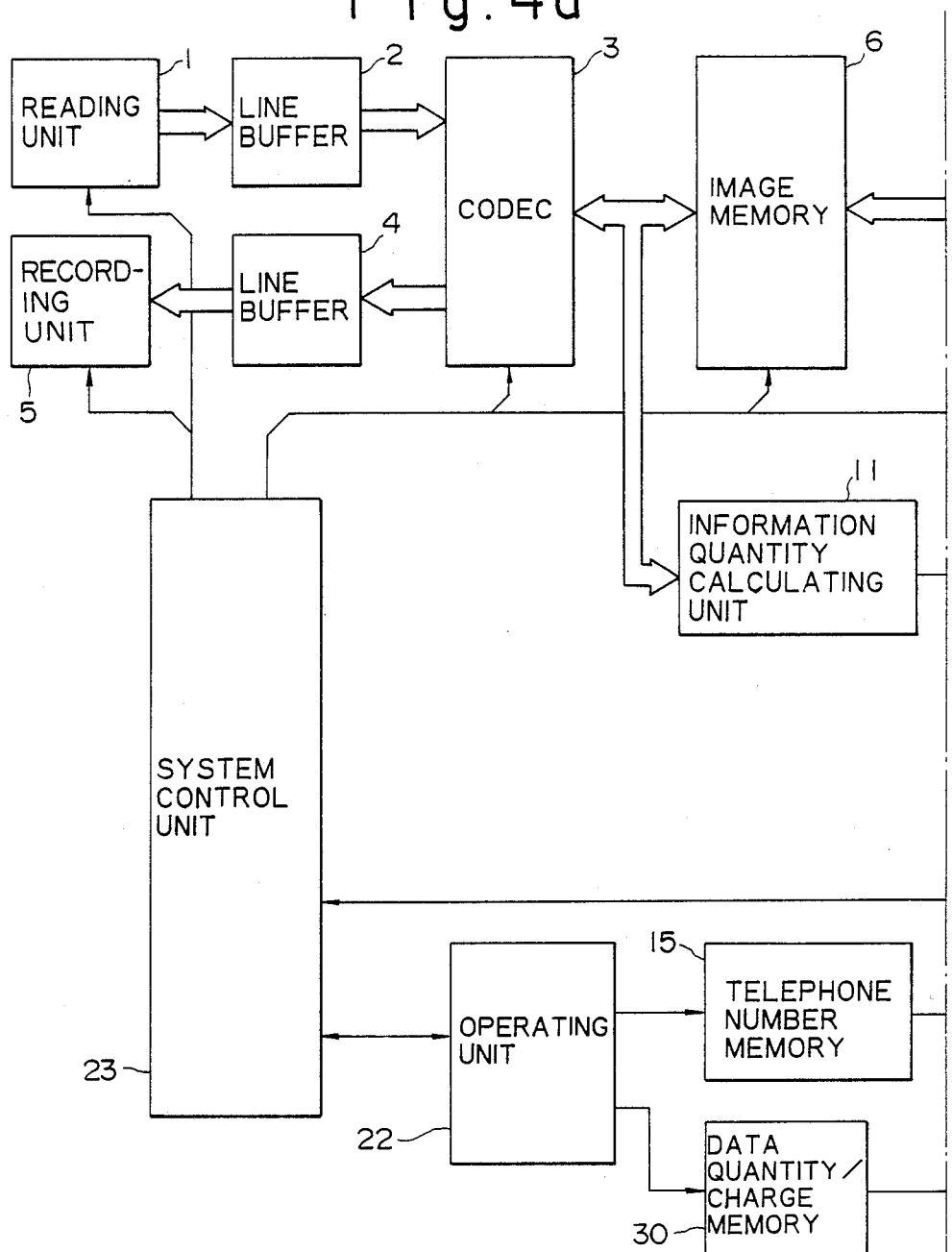
FIGS. 4a and 4b are block diagrams (which join as shown in FIG. 4) showing the overall structure of a facsimile machine constructed in accordance with another embodiment of the present invention.
Figure 4:
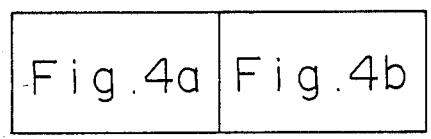
Figure 4B:
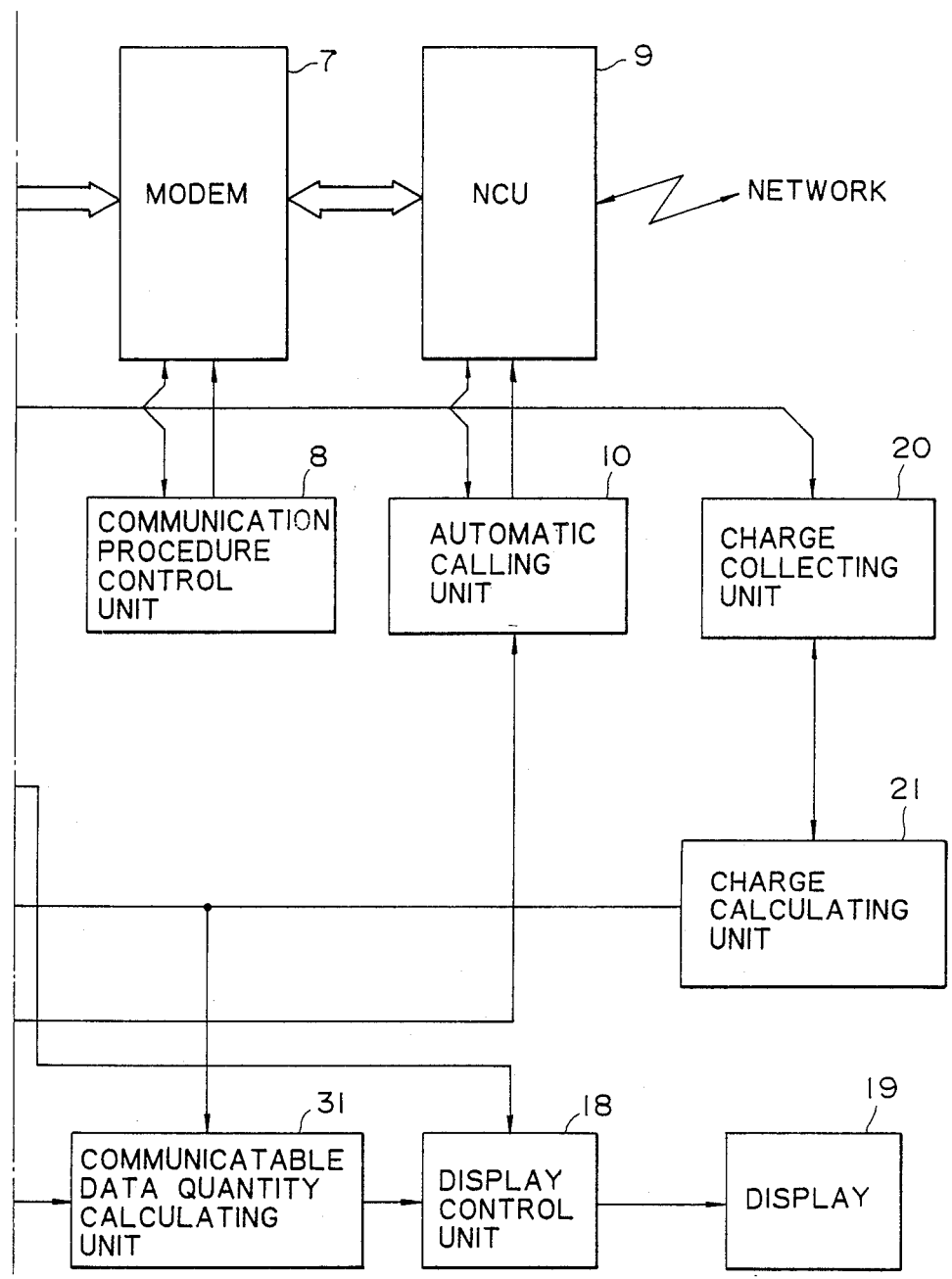

Referring now to FIGS. 4a and 4b, there is shown in block form a facsimile machine constructed in accordance with another embodiment of the present invention. As shown, the present facsimile machine is similar in structure in many respects to the previous embodiment shown in FIGS. 1a and 1b so that similar components are indicated by the similar numerals. Thus, in the following description, only those portions of the present embodiment which differ from the previous embodiment will be described in detail.

The reading unit 1 optically reads an original at a selected line density to produce image information. The line density in such optical reading is specified as 8 dots/mm in the main scanning direction and 7.7 lines/mm or 3.85 lines/mm in the auxiliary scanning direction in the G III Standards of the CCITT Recommendations. In the reading unit 1 of the present embodiment, it is so structured that optical reading is carried out with 8 dots/mm in the main scanning direction and 3.85 lines/mm in the auxiliary scanning direction. The information counting unit 11 detects the amount of the data stored in the image memory 6, i.e., all of the coded data of the image information optically read by the reading unit 1 with 8 dots/mm in the main scanning direction and 3.85 lines/mm in the auxiliary scanning direction and calculates the corresponding amount of data when reading is carried out with 8 dots/mm in the main scanning direction and 7.7 lines/mm in the auxiliary scanning direction based on the thus detected amount of data.

A data quantity/charge memory 30 is provided for determining the amount of data which can be transmitted by a predetermined unit charge from the place where the present facsimile machine is installed to a destination station at a remote place. That is, given that a time period required for a communication control procedure is designated by $T_1$ (sec), the quantity or amount of image data to be transmitted by D (bits), the data transmission speed, for example, by 4,800 bps, a communication charge per second by $C_1$ and an apparatus use charge by $C_2$, the total service charge for transmitting data may be calculated by the following formula.

$$C_0 = (T_1 + D/4,800) \times C_1 + C_2.$$

The data quantity/charge memory 30 stores the information regarding the amount or quantity of data which may be transmitted by a predetermined unit charge to each location of a country in accordance with the above equation. Since the telephone charge differs depending on the distance, the quantity or amount of data which can be transmitted during a unit charge also differs depending on the distance. Thus, various quantities of data for the same unit charge have been previously calculated for various locations according to the above equation and stored in the memory 30. As described previously, $T_1$ slightly differs between a single page case and a multi-page case; however, it is calculated on the basis of an average number of pages for the amount of data.

Also provided in the present embodiment is a transmittable data quantity calculating unit 16 which calculates the amount of data which can be transmitted on the basis of the information regarding the amount of data to be transmitted per unit charge and the amount of money paid by the user. Receiving the amount of data of the entire image information read by the reading unit 1 and the amount of data corresponding to the amount of money paid by the user, the display control unit 18 displays which portion or range of the original may be transmitted.

Other than the above-described structure, the present embodiment shown in FIGS. 4a and 4b is similar in structure to the previous embodiment shown in FIGS. 1a and 1b. Now, the operation of the present embodiment will be described below.

The user places an original to be transmitted at the reading unit 1 and then inputs the facsimile telephone number of a destination station at a remote place to which the image data of the original is to be transmitted. Then, the user makes prepayment by inserting an appropriate number of coin or bills into the charge collecting unit 20. In this case, the user may wish to make a minimum payment initially. Then, the reading unit 1 is activated under the control of the system control unit 23 so that the original is read and its image data is coded by the CODEC 3 and temporarily stored into the image memory 6. In this instance, the image data of the original is read with the line density of 3.85 lines/mm in the auxiliary scanning direction; however, the information quantity counting unit 11 determines not only the data amount with this line density but also the data amount with the line density of 7.7 lines/mm.

Responsive to the telephone number input by the user, the data quantity/charge memory 30 outputs the amount of data which can be transmitted during a predetermined unit charge to the designated destination station. Then, at the transmittable data quantity calculating unit 31, the amount of data supplied from the memory 30 is multiplied by the amount of money paid to calculate the total amount of data which can be transmitted for the amount of money paid. Then, the display control unit 18 calculates a ratio between the transmittable data quantity and the entire data quantity for each of the two kinds of line density and displays the respective ratios at the display 19.

Figure 5A:
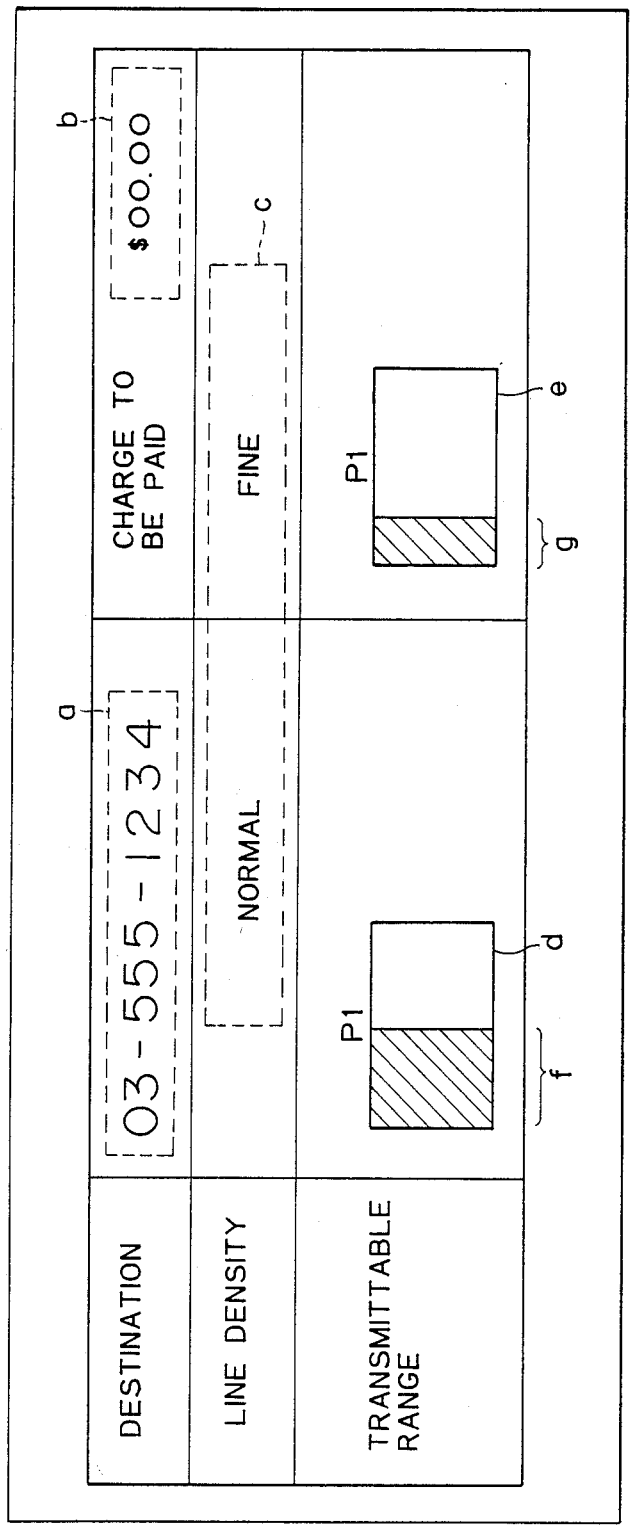
FIGS. 5a and 5b are illustrations showing examples of showing a range of a portion of one page of data, which can be transmitted by a deposited amount of money in the facsimile machine of FIGS. 4a and 4b.

FIG. 5a shows a display example for the case in which there is only one page of original to be transmitted. As shown, a destination telephone number a and an amount of money paid b are displayed together with two line densities c, i.e., "NORMAL" for 7.7 lines/mm and "FINE" for 3.85 lines/mm. Besides, "Pl" indicates the first page and in the present case there is only one page. A portion of the page d or e is blackened. The ratio between the page d or e and the blackened portion f or g corresponds to the ratio between the entire image data and the transmittable image data. That is, the blackened portion f or g indicates the transmittable portion or range in the entire page. Thus, if line density "NORMAL" is selected under the current condition, approximately the first half of the original can be transmitted with the amount of money paid; whereas, if line density "FINE" is selected, approximately the first quarter of the entire page is transmitted.

Figure 5B:
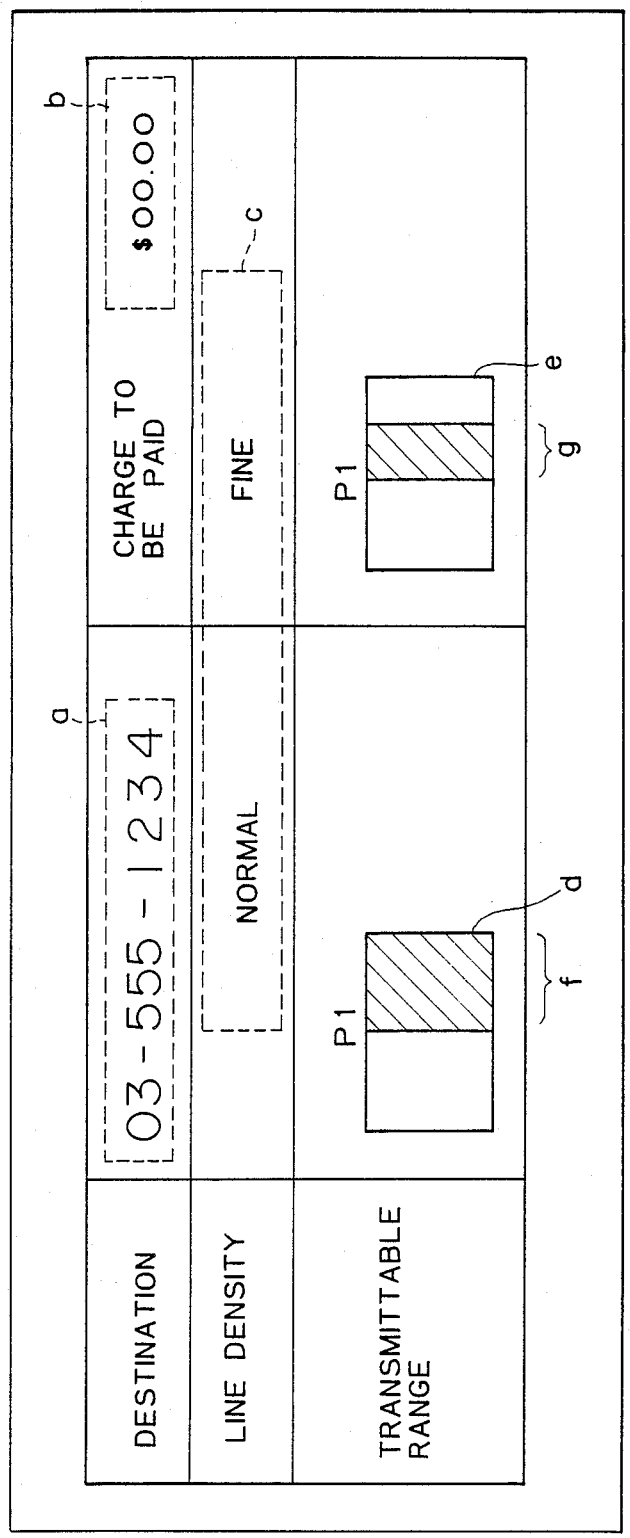

The location of the blackened portion f or g within the page d or e can be shifted by operating the operating unit 22. Thus, the user may move the blackened portion f or g to a desired portion of the page d or e. For example, if it is desired to transmit starting from the central position of the page d or e, the user may move the blackened portion f or g from the left half to the right half as shown in FIG. 5b. Then, the user selects either one of "NORMAL" or "FINE" line density by operating the operating unit 22 while checking whether a desired section of the original is covered by the blackened portion f or g. If the blackened portion f or g is smaller than the desired section, an additional charge must be inserted into the charge collecting unit 20. In response thereto, the blackened portion f or g is increased.

Figure 6:
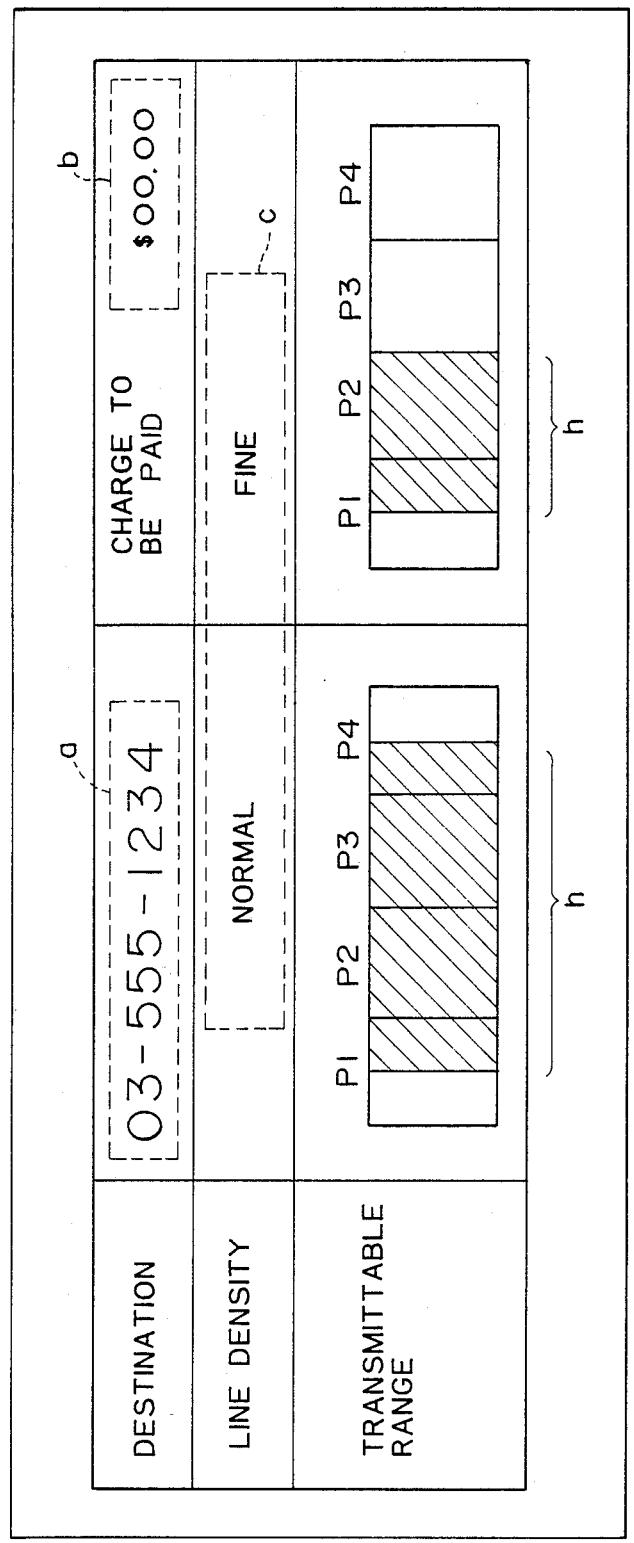
FIG. 6 is an illustration showing an example of showing a range of a portion of four pages of data, which can be transmitted by a deposited amount of money in the facsimile machine of FIG. 4.

FIG. 6 is the case in which there are four pages of originals. As shown, if line density "NORMAL" is selected, the blackened portion h extends from the center position of the first page to the center position of the fourth page, whereas, if line density "FINE" is selected, the blackened portion i extends from the center position of the first page to the end of the second page.

After setting a desired range of the original image data to be transmitted in this manner, the user depresses a start button for starting transmission of data. Thus, the automatic calling unit 10 reads out the telephone number of the destination station from the telephone number memory 15 and carries out a predetermined calling process by controlling the NCU 9. Upon receipt of a response from the destination station, the communication procedure control unit 8 executes a predetermined communication control procedure and thereafter a selected portion of the image data in the image memory 6 is transmitted to the destination station through the MODEM 7. In this case, if the transmission start position has been designated by the user as described above, a read out operation is carried out from the image data of the corresponding location in the image memory 6. Since the image data is stored in the image memory 6 with the "FINE" line density, if the line density "NORMAL" has been selected, the image data in the image memory 6 is read out, for example, every other line to thereby convert the "FINE" line density to "NORMAL" line density. Upon completion of transmission, each of the components is returned to its initial condition automatically under the control of the system control unit 23.

As described above, in accordance with this embodiment of the present invention, the user may operate the present facsimile machine by himself and thus the confidentiality of the information may be maintained. In addition, since the user may selectively determine the line density and a portion of the original image data to be transmitted, optimal transmission of image data can be carried out according to budget. In the above-described embodiment, two line densities were provided in the auxiliary direction; however, any desired number of line densities may be provided and a plurality of line densities may also be provided in the main scanning direction. In addition, the transmission speed was fixed in the above-described embodiment, however it may also be so structured that the transmission speed is varingly set in consideration of various factors, such as the conditions of a transmission line and transmission distance. Besides, the total service charge may be determined according to other schemes than the one described above. It should also be noted that this aspect of the present invention may also be applied to a facsimile machine having a copying function, in which a desired portion of an original may be selectively copied.

Figure 7A:
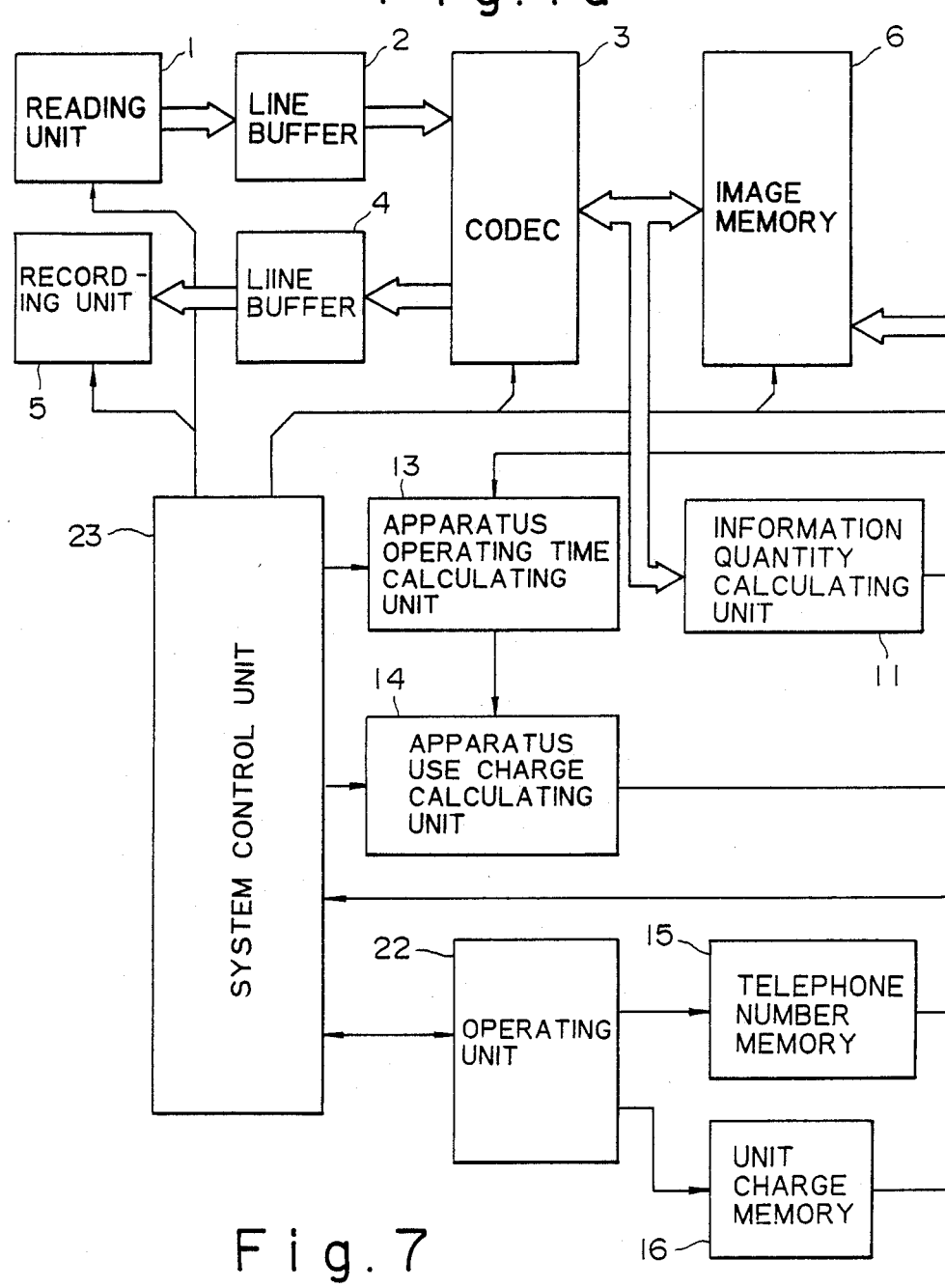
FIGS. 7a and 7b are block diagrams (which join as shown in FIG. 7) showing the overall structure of a facsimile machine constructed in accordance with a further embodiment of the present invention.
Figure 7:
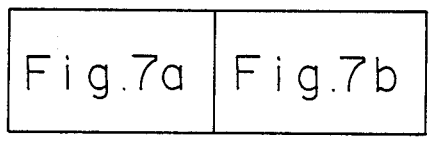

FIGS. 7a and 7b illustrates in block form a facsimile machine constructed in accordance with a further embodiment of the present invention. The present embodiment shown in FIGS. 7a and 7b is similar in many respects to the embodiment shown in FIGS. 1a and 1b. Thus, the present embodiment will be described mainly in those portions which differ from the embodiment shown in FIGS. 1a and 1b, so that most of the description regarding the embodiment shown in FIGS. 1a and 1b is equally applicable to the present embodiment.

In the embodiment shown in FIGS. 7a and 7b, the MODEM 7 has a function of transmitting data at one of four different transmission speeds, i.e., 9,600, 7,200, 4,800 and 2,400 bps, selectively. That is, the transmission speed is set at one of these four as gradually falling back from 9,600 bps by MODEM training which takes place during a communication control procedure. Accordingly, in the present embodiment, the communication time calculating unit 12 of the present embodiment calculates a communication time period $T_0$ using the following equation.

$$T_0 = (D/S) + T_1$$

where,
D: amount of data;
$T_1$: time required for a communication control procedure; and
S: data transmission speed.

In the present embodiment shown in FIGS. 7a and 7b, there are also provided a charge returning unit 40 and a charge difference calculating unit 41. The charge difference calculating unit 41 calculates a difference between the initially calculated charge and the finally determined charge, and the charge returning unit 40 returns a balance of the charge to the user if the charge paid is larger than the finally determined charge.

The operation of the structure shown in FIGS. 7a and 7b will be described with reference to a flow chart shown in FIGS. 8a and 8b. When the user wishes to transmit information by the facsimile machine shown in FIGS. 7a and 7b, the user, in the first place, sets an original at the reading unit 1 an then inputs the telephone number of a destination station at the operating unit 24 (step 131). Then, under the control of the system control unit 23, the reading unit 1 is activated and image information read from the original is coded by the OCDEC 3 and sequentially stored into the image memory 6 temporarily (step 132). While the image data is being stored into the image memory 6, the information counting unit 11 counts the amount or quantity of data being stored into the image memory 6 to thereby detect the amount of quantity of entire image data. The communication time calculating unit 12 calculates a communication time period using the above equation based on the thus determined amount of data to be transmitted, a data transmission speed and a time period required for a communication control procedure. In this case, since the data transmission speed is determined by the communication control procedure subsequent to the initiation of a communication process, the calculation here is carried out using the slowest transmission speed of 2,400 bps. On the other hand, the unit charge memory 16, responsive to the telephone number information of the destination station input therein, outputs a corresponding communication charge per unit time, e.g., one second. The communication charge per unit time is multiplied by the above-calculated communication time period to thereby determine a necessary communication charge at the communication charge calculating unit 17.

The display control unit 18 receives an apparatus use charge from the apparatus use charge calculating unit 14 and adds this to the communication charge supplied from the communication charge calculating unit 17 to determine a service charge $C_0$ (step 133). Thus, as shown in FIG. 9, communication charge a, apparatus use charge b and service charge c, which is a sum of the former two, are displayed at the display 19, together with a charge payment request message d and destination information e (step 134). Then, the user pays the service charge displayed at the display 19 to the charge collecting unit 20. The charge counting unit 21 counts the charge paid and the charge difference calculating unit 41 checks its result (step 135). Then, the automatic calling unit 10 reads out the telephone number of the destination station from the telephone number memory 15 and executes a predetermined calling operation through the NCU 9. If a response from the destination station has been received, a predetermined transmission process is initiated (step 136).

Figure 10:
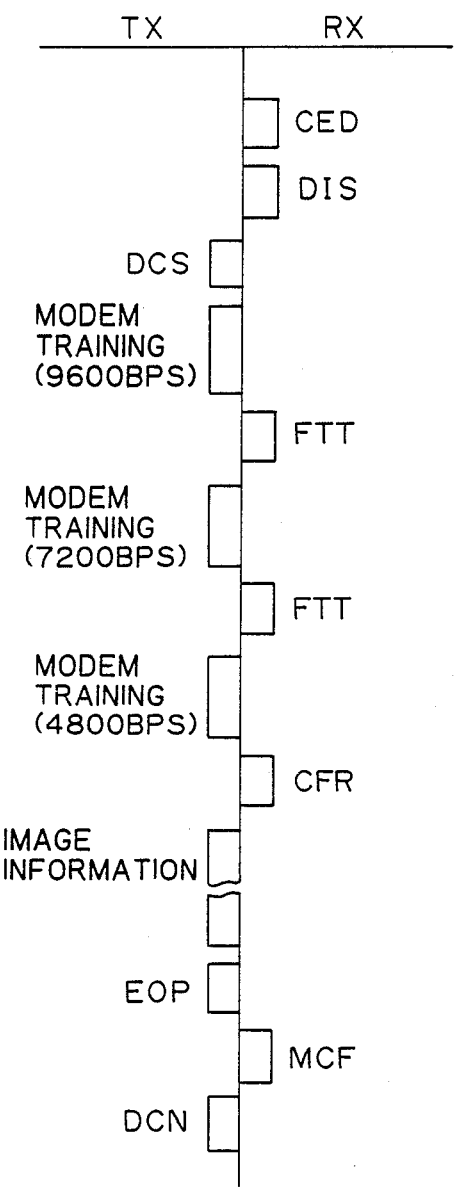
FIG. 10 is an illustration showing a communication control procedure in transmitting data by facsimile.

FIGS. 4a and 4b illustrate an example of a communication control procedure. That is, upon receipt of signals CED and DIS from receiver RX, transmitter TX sends DCS and MODEM training signals. This MODEM training signal is sent initially at the highest transmission speed of 9.600 bps. Then, receiver RX executes MODEM training and if a high data error rate has been obtained, receiver RX sends an FTT signal. Upon receipt of this FTT signal, transmitter TX lowers the transmission speed by one step and then sends another MODEM training signal. Such a procedure is repeated and when the condition for permitting receiver RX to receive data has been obtained, receiver RX sends a CFR signal. When transmitter TX has received this CFR signal, transmitter TX fixes or finally determines the transmission speed at a specific transmission speed $S_1$. FIG. 10 illustrates the case in which the transmission speed has been finally set at 4,800 bps.

The system control unit 23 monitors the progress of this communication control procedure (step 137) and when the actual transmission speed $S_1$ has been finally determined (Y of step 137), the actual transmission speed $S_1$ is compared with the transmission speed of 2,400 bps which has been previously determined as an initial transmission speed for the calculation of a preliminary service charge (step 138). If the acutal transmission speed $S_1$ is not equal to the preliminary transmission speed of 2,400 bps (N of step 138) as in the present embodiment, an actual service charge $C_1$ is calculated using the actual transmission speed $S_1$ in a similar manner (step 139). Then, a charge difference between the preliminary and actual service charges $C_1$ and $C_0$ is calculated and such a charge difference is returned to the user by the charge returning unit 40 (step 140). At this time, the actual service charge thus calculated is displayed at the display 19.

In parallel with the above-described steps 137–140, the image data in the image memory 6 is transmitted to receiver RX (destination station) through the MODEM 7 as shown in FIG. 10, and following the image information, an EOP signal is transmitted. Then, receiver RX sends an MCF signal and transmitter TX sends a DCN signal to complete the communication process.

On the other hand, if no charge has been paid (N of step 135), no transmission process is executed. If the actual transmission speed has turned out to be 2,400 bps (Y of step 138), then a transmission process is executed right away. If the destination station was busy or no response has been received from the destination station, the charge paid in the charge collecting unit 20 is returned to the user from the charge returning unit 40.

Figure 8A:
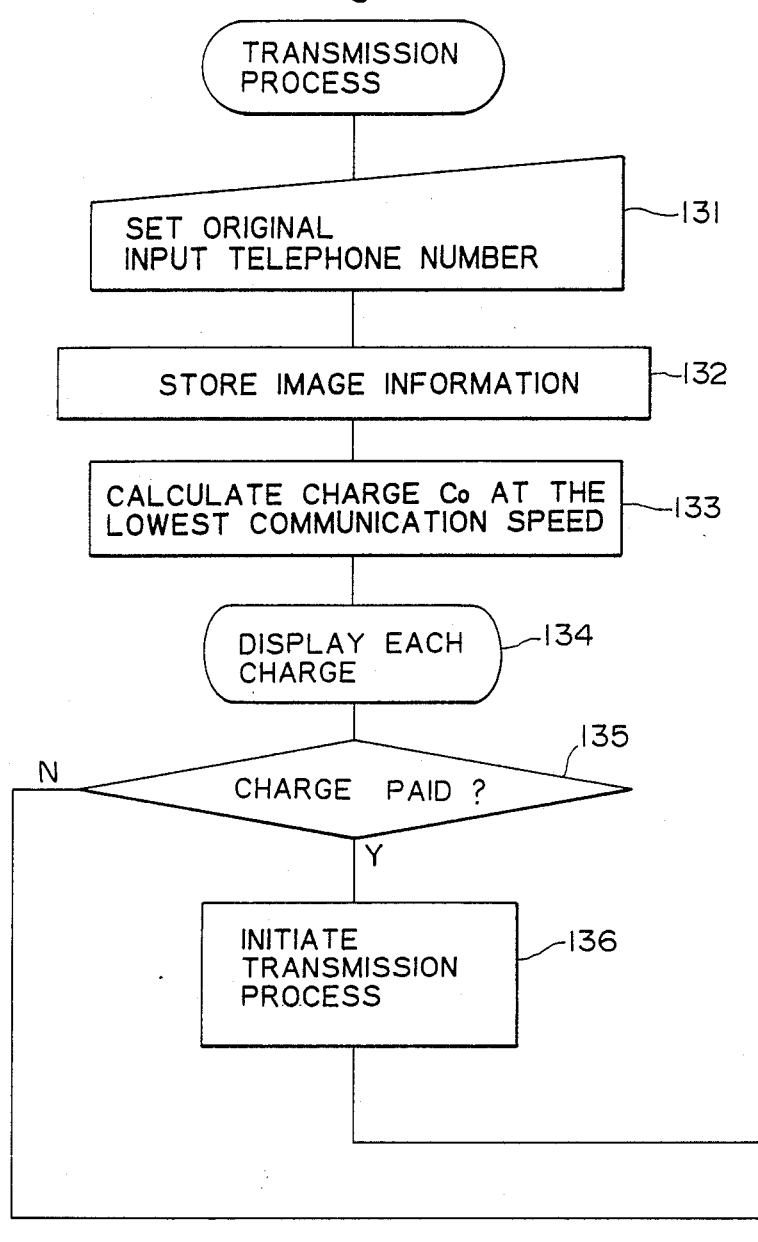
FIGS. 8a and 8b when joined as in FIG. 8 are a flow chart which is useful for understanding the operation of the structure shown in FIGS. 7a and 7b.
Figure 8:
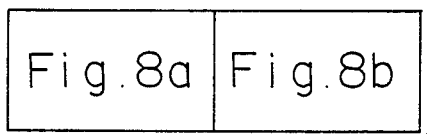
Figure 8B:
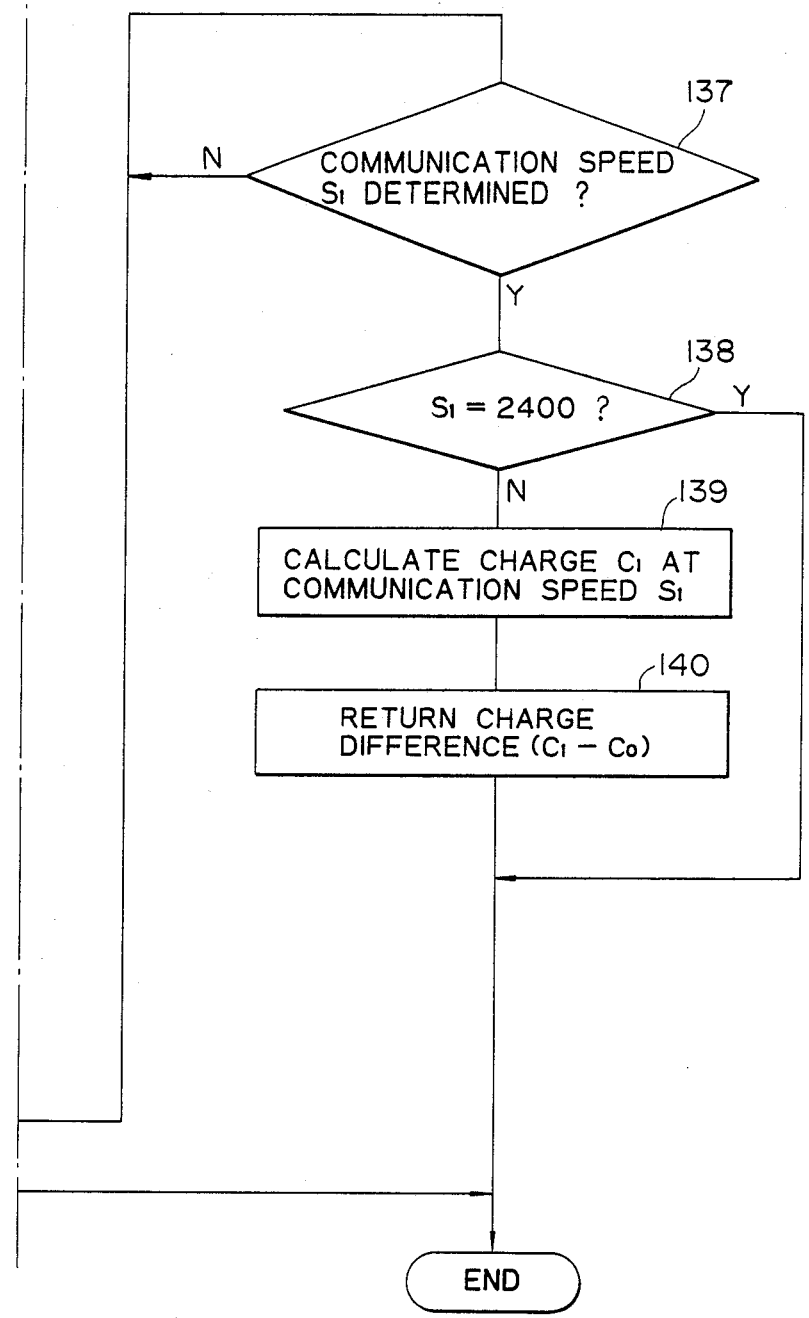
Figure 11A:
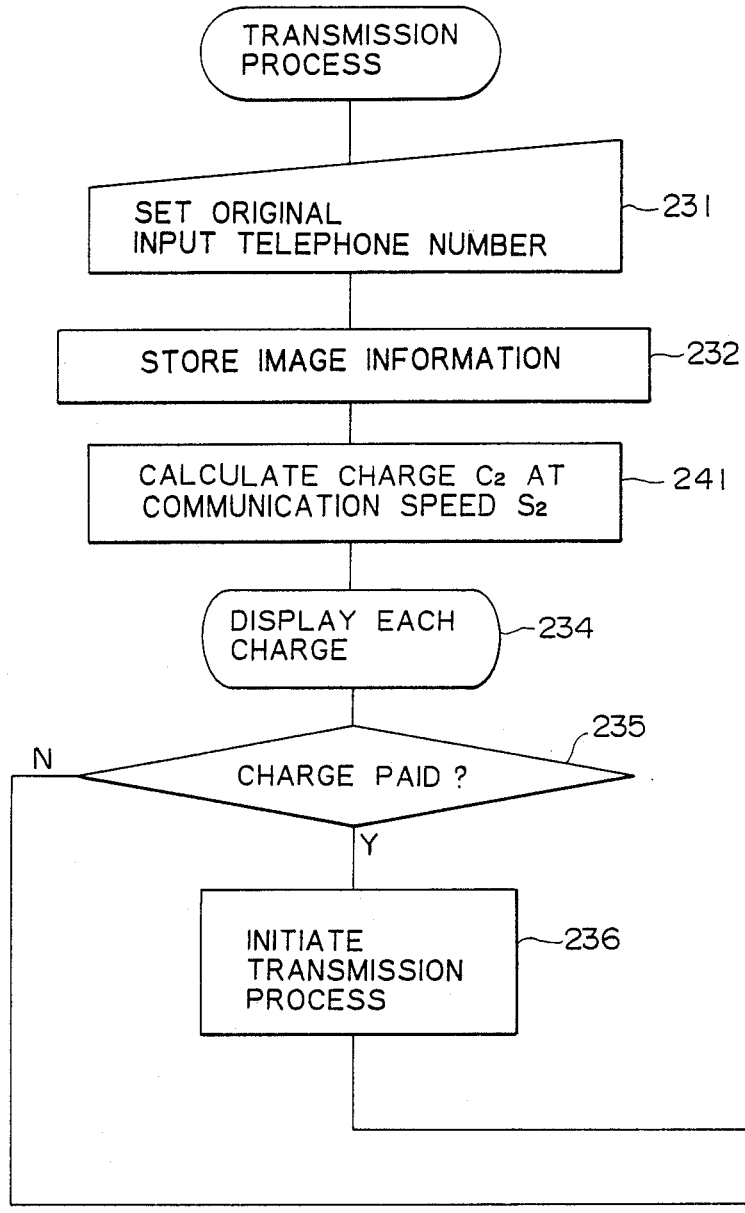
FIGS. 11a and 11b are flow charts (which join as shown in FIG. 11) showing a sequence of steps in another embodiment of facsimile machine.
Figure 11:
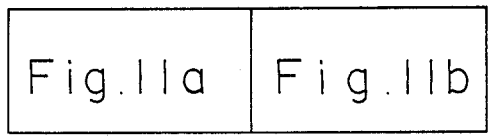
Figure 11B:
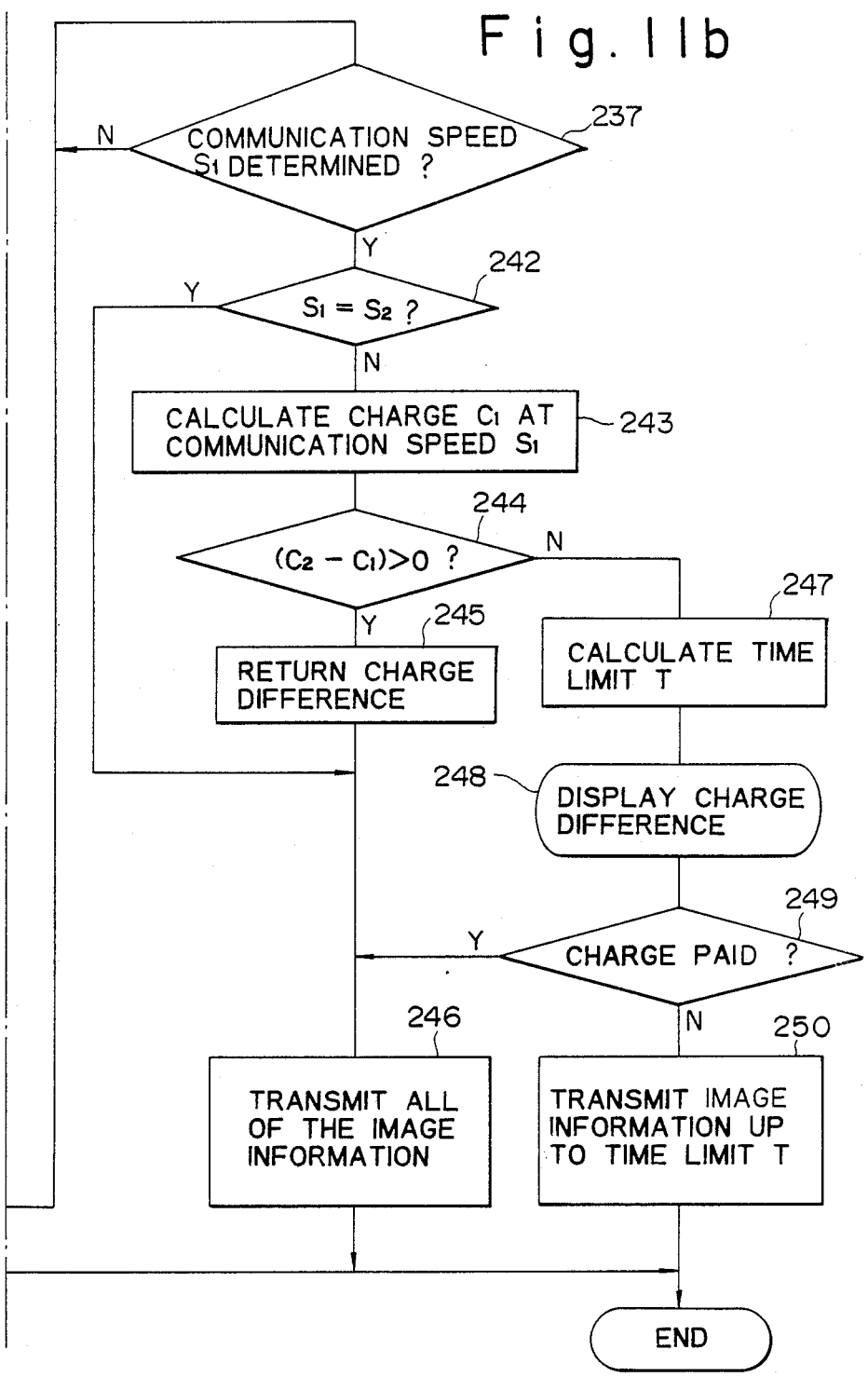

FIGS. 11a and 11b shows another embodiment of this aspect of the present invention and this embodiment is similar in many respects to the embodiment shown in FIGS. 8a and 8b. In the present embodiment, after setting of original and inputting of a telephone number (step 231) and reading of the original (step 232), a preliminary service charge $C_2$ is calculated using a most commonly used transmission speed $S_2$ (step 241). In the previously described MODEM training, transmission speed $S_2$ has been set depending on the condition of the transmission line; on the other hand, in the present embodiment, transmission speed $S_2$ is previously set as the most commonly used transmission speed. Then, when the preliminary service charge has been paid (Y of step 235), a transmission process is initiated (step 236) and, then, when the actual transmission speed $S_1$ has been determined (Y of step 237), this actual transmission speed $S_1$ is compared with the preliminary transmission speed $S_2$ (step 242), whereby the service charge $C_1$ is recalculated using the actual transmission speed $S_1$ in case of disagreement between the preliminary and actual transmission speeds (step 243). Thereafter, a charge difference between the preliminary and actual service charges $C_2$ and $C_1$, and if this charge difference is positive, it is returned to the user (step 245) while carrying out a predetermined transmission process to transmit all of the image data (step 246). On the other hand, if the charge difference is negative in value, a time limit T in transmitting the image data by the preliminary service charge $C_2$ is calculated (step 247). Then, as shown in FIG. 12, charge paid f, actual service charge $C_1$ and a charge difference h between these two are displayed, together with a message i requesting to pay the negative charge difference within the time limit T, at the display 19 (step 247). Then, it is checked whether the negative charge difference has been paid (step 249) and if paid within the time period T, a normal transmission process follows (step 246). On the other hand, if the balance has not been paid in time, the transmission process ensues only up to time limit T (step 250).

As described above, in the present embodiment, since it is so structured that the preliminary service charge is calculated by the most commonly used transmission speed instead of the lowest transmission speed as in the case of the previous embodiment, it is less likely for the user to overpay or underpay at the outset. In the above-described embodiment, the most commonly used transmission speed $S_2$ is fixed at a specific value; however, the value of the transmission speed $S_2$ may also be set varingly, for example, by taking an average over a certain period of time in the past. If the additionally paid charge is short, it may be so structured to continue transmission over a period of time corresponding to the additionally paid charge. In this case, it may also be so structured to automatically alter to a coarser line density so as to transmit as much image data as possible.

In the embodiment shown in FIGS. 8a and 8b, the actual communication time is calculated when the data transmission speed has been finally determined and the actual service charge is recalculated based on the thus calculated actual communication time. Alternatively, it may also be so structured that while measuring the communication time during communication, the actual service charge is recalculated using the actually measured communication time upon completion of transmission, in which case the service charge can be calculated most accurately. In addition, it may also be so structured that if the communication is disconnected in process due, for example, to transmission errors, the charge is returned depending on the amount of image data which has been successfully transmitted.

FIGS. 13a and 13b illustrate in block form a facsimile machine constructed in accordance with a still further embodiment of the present invention. The present embodiment is similar in structure in many respects to the embodiment shown in FIGS. 7a and 7b so that like numerals indicate like elements. The present embodiment has an additional provision of a history information memory 42 and an image information converting unit 43 so that a statement of use with various information is output after each use. That is, the history information memory 42 stores such information as destination, date, time, communication time period, breakdown of service charge and other related information each time when the present facsimile machine is used. The image information converting unit 43 includes a character generator which converts character codes of the history information stored in the memory 42 into character pattern data to thereby permit to record the information stored in the memory 42 on a recording material, such as a sheet of paper, by the recording unit 5.

Figure 14A:
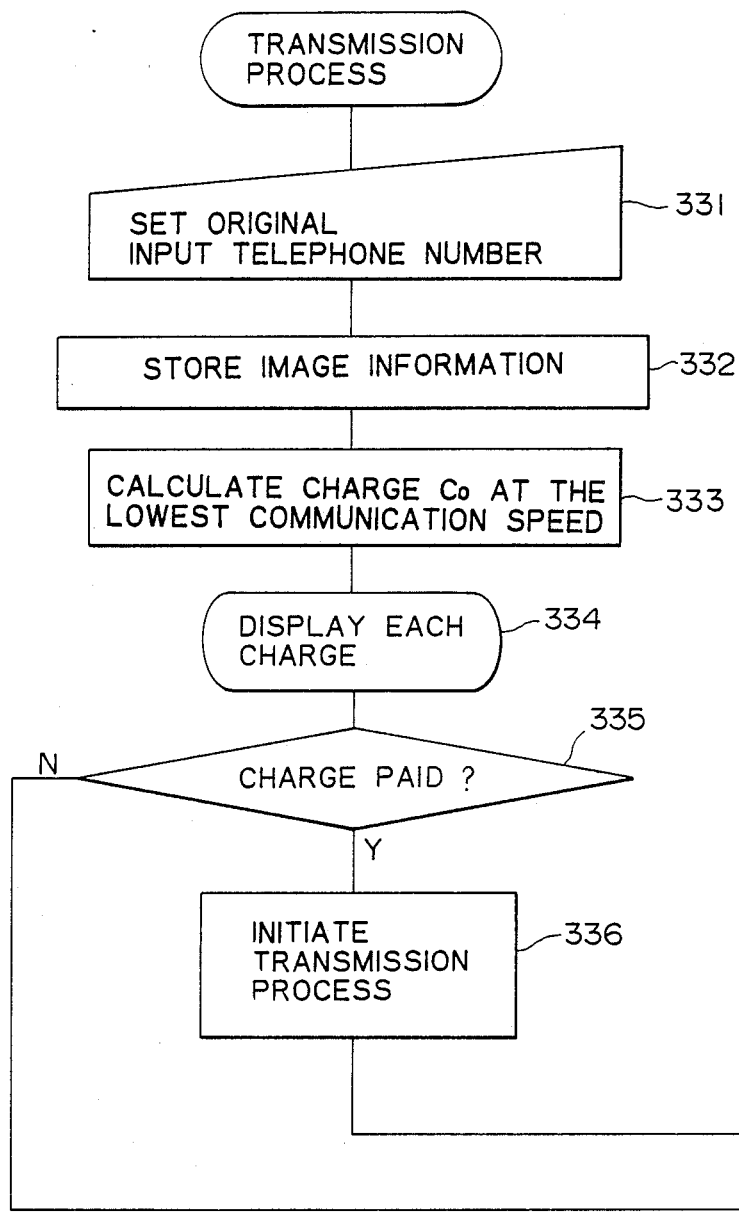
FIGS. 14a and 14b are flow charts which are joined as in FIG. 14 and are useful for understanding the operation of the structure shown in FIGS. 13a and 13b.
Figure 14:
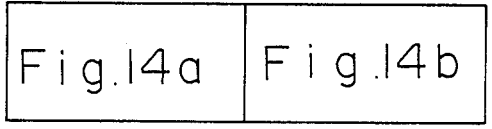
Figure 14B:
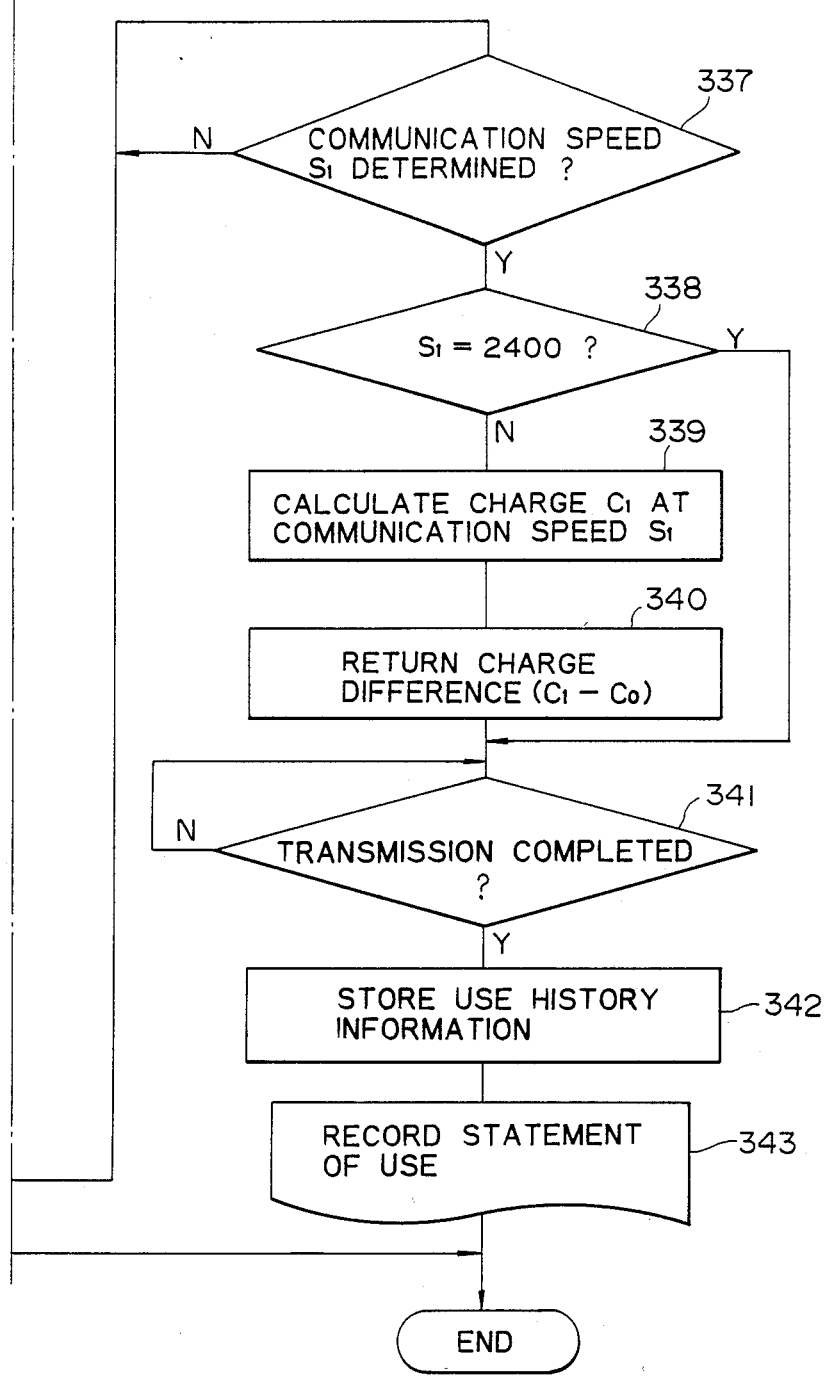
Figure 15:
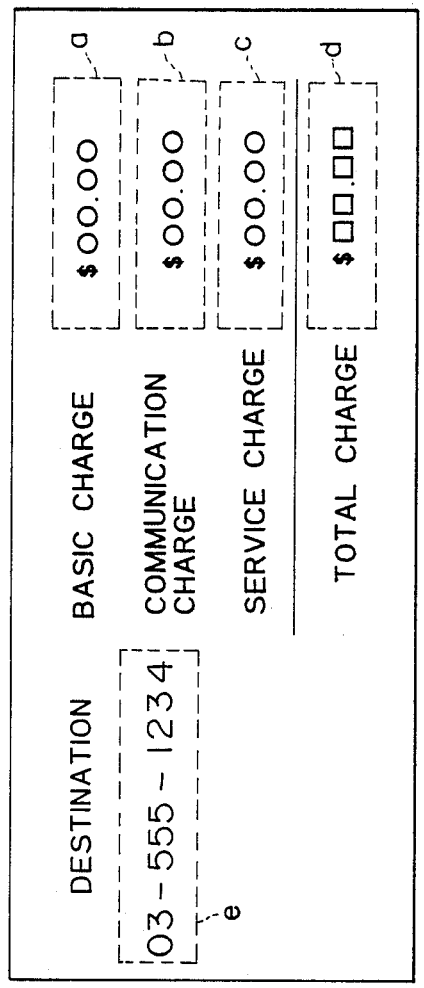
FIG. 15 is an illustration showing an example of displaying a transmission service charge in the structure shown in FIGS. 13a and 13b.

The operation of the present embodiment may be understood once reference is made to the flow chart shown in FIGS. 14a and 14b which is similar to the flow chart shown in FIGS. 8a and 8b excepting the fact that three steps 341 through 343 have been newly added in the present embodiment. Since the operation from step 331 to step 340 is exactly the same as that of step 131 to step 140 in FIGS. 8a and 8b, reference should be made to the corresponding description for FIGS. 8a and 8b. In the present embodiment shown in FIGS. 14a and 14b, when the transmission process has been completed (Y of step 341), various information, such as destination, communication time period, apparatus operating time period and breakdown of the service charge, which has been used in the communication process, are input from various components of the present facsimile machine and stored into the history information memory 42 (step 342). And, then, these various information is converted into character pattern data by the image information converting unit 43, which is then supplied to the recording unit 5 via the line buffer 4. As a result, these information is recorded on a sheet of paper by the recording unit 5 in the form of a statement of use for document transmission service.

FIGS. 4a and 4b illustrate an example of a statement of use recorded on a sheet of paper by the recording unit 5 in accordance with the present embodiment. In the illustrated example, the statement of use includes such information as service charge f, destination g communication time h, communication time period i, basic charge j, communication charge k, service charge l, date m, and the name of the company n which provides the document transmission service (step 343). Upon outputting of this statement of use, the transmission process is terminated. Other various information than destination and communication charge stored in the history information memory 42 may also be output as recorded by the recording unit 5.

In the present embodiment, if a person in charge of the maintenance of the present facsimile machine wishes to check the history of service in the past, the information stored in the history information memory 42 may be recorded on a sheet of paper in chronological order by the recording unit 5 through the operating unit 22. FIG. 17 illustrates one such example and it includes such information as date m, destination g, indication of copy mode if used for copying o, communication time h, communication time period i, total service charge f, basic charge j, communication charge k, apparatus use charge l and totals p of respective items.

In the above-described embodiment, a statement of use is output at the end of the process; alternatively, it may also be so structured that a statement of use is output subsequent to step 340, if desired.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A communication terminal having a service charge displaying function, comprising:
    storing means for storing data temporarily;
    transmitting means for transmitting said data stored in said storing means to another communication terminal at a remote place through a transmission line;
    calculating means for calculating a charge for transmitting said data stored in said storing means to said another communication terminal;
    displaying means for displaying said calculated charge so that a user may recognize how much it costs to transmit said data;
    charge collecting means for collecting a charge paid by the user;
    controlling means for controlling said transmitting means such that said transmitting means initiates transmission of said data stored in said storing means to said another communication terminal only when at least a part of said calculated charge has been paid by said user at said charge collecting means; and
    unit charge determining means for determining a unit charge per unit time depending on a distance to said another communication terminal, wherein said calculating means calculates said charge based on the product of said unit charge determined by said unit charge determining means and a calculated time period for transmitting said stored data to said another communication terminal.

2. A communication terminal having a service charge displaying function, comprising:
    storing means for storing data temporarily;
    transmitting means for transmitting said data stored in said storing means to another communication terminal at a remote place through a transmission line;
    total charge calculating means for calculating a total charge for transmitting said data stored in said storing means to said another communication terminal;

displaying means for displaying said calculated total charge so that a user may recognize how much it costs to transmit said data;
- charge collecting means for collecting a charge paid by the user;
controlling means for controlling said transmitting means such that said transmitting means initiates transmission of said data stored in said storing means to said another communication terminal only when at least a part of said calculated total charge has been paid by said user at said charge collecting means;
wherein said total charge calculating means comprises,
unit charge determining means for determining a unit charge per unit time depending on a distance to said another communication terminal,
communication timer period calculating means for calculating a communication time period for transmitting said data stored in said storing means to said another communication terminal plus a time period required for a communication control procedure executed by said transmitting means, and
communication charge calculating means for calculating a communication charge as a product between said unit charge and said communication time period,
wherein said total charge calculating means includes said communication charge as part of said total charge.

3. The terminal of claim 2, wherein said total charge calculating means calculate said total charge as a sum of said communication charge and a terminal use charge which is determined in a predetermined manner in accordance with a length of time of operation of the present terminal.

4. The terminal of claim 2, further comprising determining means for determining an amount of said data stored in said storing means which can be transmitted to said another communication terminal by an amount of charge paid by said user at said charge collecting means, whereby that portion of said data which can be transmitted is indicated in said displaying means.

5. The terminal of claim 4, wherein said determining means determines said amount at two or more different line densities and said that portion of said data which can be transmitted is indicated in said displaying means for each of said two or more line densities.

6. The terminal of claim 4, further comprising setting means for setting said that portion of said data which can be transmitted to a desired location within the data.

7. The terminal of claim 2, further comprising charge returning means for returning at least part of said charge paid to said charge collecting means, whereby said total charge calculating means calculates said total charge as a preliminary charge using a lowest transmission speed available and said controlling means causes said calculating means to recalculate said total charge as an actual charge using an actual transmission speed after initiation of transmission by said transmitting means to thereby return an excessive charge as a difference between said preliminary and actual charges, if any, by said charge returning means.

8. The terminal of claim 7, wherein said recalculation by said total charge calculating means is carried out upon completion of transmission by said transmitting means based on an actually measured communication time period.

9. The terminal of claim 7, wherein if said difference between said preliminary and actual charges is negative in value, said displaying means displays a statement requesting to pay an additional charge corresponding to such a difference, whereby the transmission of said data by said transmitting means is continued only when at least part of said additional charge has been paid in said charge collecting means in time.

10. The terminal of claim 2, further comprising outputting means for outputting said total charge calculated by said total charge calculating means, together with other predetermined information, as recorded on a sheet of paper in the form of a statement of use 11. The terminal of claim 10, further comprising a memory for storing predetermined information including said total charge calculated by said total charge calculating means, whereby said outputting means causes said predetermined information stored in said memory to be output as recorded on a sheet of paper in the form of a use history management table.

12. The terminal of claim 10, wherein said terminal is a facsimile machine having a copying function for copying an original image on a sheet of paper, whereby said total charge calculating means also calculates a copying charge for copying an original image and said displaying means displays said copying charge when set in a copying mode.

13. The terminal of claim 1, further comprising determining means for determining an amount of said data stored in said storing means which can be transmitted to said another communication terminal by an amount of charge paid by said user at said charge collecting means, whereby that portion of said data which can be transmitted is indicated in said displaying means.

14. The terminal of claim 13, wherein said determining means determines said amount at two or more different line densities and said that portion of said data which can be transmitted is indicated in said displaying means for each of said two or more line densities.

15. The terminal of claim 13, further comprising setting means for setting said that portion of said data which can be transmitted to a desired location within the data.

16. The terminal of claim 1, further comprising charge returning means for returning at least part of said charge paid to said charge collecting means, whereby said calculating means calculates said charge as a preliminary charge using a lowest transmission speed available and said controlling means causes said calculating means to recalculate said charge as an actual charge using an actual transmission speed after initiation of transmission by said transmitting means to thereby return an excessive charge as a difference between said preliminary and actual charges, if any, by said charge returning means.

17. The terminal of claim 16, wherein said recalculating by said calculating means is carried out upon completion of transmission by said transmitting means based on an actually measured communication time period.

18. The terminal of claim 16, wherein if said difference between said preliminary and actual charges is negative in value, said displaying means displays a statement requesting to pay an additional charge corresponding to such a difference, whereby the transmission of said data by said transmitting means is continued only when at least part of said additional charge has been paid in said charge collecting means in time.

19. The terminal of claim 1, further comprising outputting means for outputting said charge calculated by said calculating means, together with other predetermined information, as recorded on a sheet of paper in the form of a statement of use.

20. The terminal of claim 19, further comprising a memory for storing predetermined information including said charge calculated by said calculating means, whereby said outputting means causes said predetermined information stored in said memory to be output as recorded on a sheet of paper in the form of a use history management table.

21. The terminal of claim 19, wherein said terminal is a facsimile machine having a copying function for copying an original image on a sheet of paper, whereby said calculating means also calculates a copying charge for copying an original image and said displaying means displays said copying charge when set in a copying mode.

* * * * *